United States Patent [19]

Porter, II

[11] 4,439,404

[45] * Mar. 27, 1984

[54] SEPARATION OF URANIUM ISOTOPES

[75] Inventor: John T. Porter, II, Del Mar, Calif.

[73] Assignee: GA Technologies Inc., San Diego, Calif.

[ * ] Notice: The portion of the term of this patent subsequent to Apr. 29, 1997 has been disclaimed.

[21] Appl. No.: 96,442

[22] Filed: Nov. 21, 1979

Related U.S. Application Data

[63] Continuation-in-part of Ser. No. 747,102, Dec. 3, 1976, Pat. No. 4,200,507.

[51] Int. Cl.³ ............................................. B01D 59/00
[52] U.S. Cl. ................................. 423/3; 204/157.1 R; 204/158 R
[58] Field of Search ................. 204/DIG. 11, 158 R, 204/157.1 R, 157.1 H; 423/3

[56] References Cited

U.S. PATENT DOCUMENTS

| | | | |
|---|---|---|---|
| 3,937,956 | 2/1976 | Lyon | 204/157.1 R |
| 3,983,020 | 9/1976 | Moore et al. | 204/157.1 R |
| 4,032,419 | 6/1977 | Bernstein | 204/157.1 R |
| 4,097,384 | 6/1978 | Coleman et al. | 250/527 |
| 4,200,507 | 4/1980 | Porter | 204/158 R |

OTHER PUBLICATIONS

Ronn, "Laser Chemistry", *Scientific American*, (May 1979), pp. 114–128.

Farrar et al., "Photochemical Isotope Separation as Applied to Uranium", Union Carbide Corp., Mar. 15, 1972, pp. 17–20.

*Primary Examiner*—Deborah L. Kyle
*Attorney, Agent, or Firm*—Fitch, Even, Tabin & Flannery

[57] ABSTRACT

Methods and apparatus for separation of uranium isotopes by selective isotopic excitation of photochemically reactive uranyl salt source material at cryogenic temperatures, followed by chemical separation of selectively photochemically reduced $U^{+4}$ thereby produced from remaining uranyl source material.

4 Claims, 3 Drawing Figures

SEPARATION OF URANIUM ISOTOPES

This application is a continuation-in-part of application Ser. No. 747,102 filed Dec. 3, 1976 and entitled "Separation of Uranium Isotopes" now U.S. Pat. No. 4,200,507.

The present invention is directed to isotope separation, and more particularly, is directed to the solid state laser enrichment of uranium.

The enrichment of uranium has conventionally been carried out by means of costly and energy intensive mechanical separation techniques, and more recently it has been proposed to use laser applications in the separation of uranium isotopes in the gaseous state.

In this connection, photochemical uranium isotope separation concepts have received attention in the art, and the spectroscopic properties of uranium compounds, including isotope effects, have also received study [G. Dieke, et al., "Spectroscopic Properties of Uranium Compounds" National Nuclear Energy Series Division III, Volume 2, McGraw-Hill, (1949); E. Rabinowitch, et al., "Spectroscopy and Photochemistry of Uranyl Compunds", MacMillian, (1964); (bracketed references are incorporated by reference)]. However, conventional, known laser separation techniques as, for example described in U.S. Pat. Nos. 3,443,087, 3,558,877, 3,673,406 and 3,772,519, British Pat. Nos. 1,237,474 and 1,284,620, and French Patent No. 1,391,738 suffer various disadvantages in respect of efficient, effective and practical photochemical separation of uranium isotopes.

The potential for interaction of an isotopic effect and a monochromatic light source has been recognized since the earliest attempts at photoseparation of isotopes, including successful experiments with chlorine and mercury [Kuhn, et al., Z. Phys. Chem. Abt., B 50 (1941); Billings et al., J. Chem. Phys., 21, 1762 (1953)] and unsuccessful attempts with uranium [Lipkin et al. "Photochemistry of Systems Containing Uranium Compounds", Columbia University, Division of War Research, Project DSM Report CU-X-17 (1942)].

Because of the small magnitude of isotope effects for uranium, isotopic effects are effectively limited to gaseous systems or solids at low temperatures for which appreciable photoreactivity is not normally exhibited. For liquids, or solids at ordinary temperatures, statistical fluctuations of energy states exceed the energy differences associated with any isotope effect, and spectral features are broad compared to expected isotopic splitting effects.

The number of gaseous systems for uranium enrichment is limited. Possible multiphoton ionization of gaseous elemental uranium is, conceptually, perhaps the simplest. This approach is actively being examined but must resolve various technological difficulties in respect of preparing and handling gaseous uranium.

The number of molecular gas species for uranium is limited. Uranium hexafluoride is certainly the best known but there are, in addition, tetraborohydride and, at moderate temperature, tetrachloride and uranocene. These are all polyatomic molecules that are expected to have banded rather than line electronic absorption spectra. This is borne out by published spectra. In the absence of line spectra, isotopic splitting will be buried in a virtual continuum and selective excitation cannot be achieved.

The alternative of using selective infrared absorption, which provides vibrational excitation, is available. Selective vibrational excitation with a single photon would not be expected to result in any usable physical or chemical transformation but could prepare an energetically distinguishable population that might be further operated up on by one or more additional photons, leading ultimately to an energy level that might dissociate or otherwise react. Since gaseous molecular species of uranium have low energy vibrational modes, problems may be encountered in respect of hot bands in the spectra, i.e., transitions originating from thermally populated states above the ground state, or from limitations in the rate at which molecules can be supplied to the ground state, which has been termed a bottleneck effect [Letokhov et al., Soviet Physics JETP 36, 1091 (1973);]. Zh. Eksp. Teov. Fiz. 63, 2064(1972). While such effects can be mitigated by operation at lower temperatures, lower temperature operation tends to conflict with the maintenance of a gaseous system.

Accordingly, it is an object of the present invention to provide improved systems, including methods and apparatus for photochemically separating uranium isotopes. These and other objects of the present invention are more particularly set forth in the following detailed description and in the accompanying drawings of which:

Figure 1:
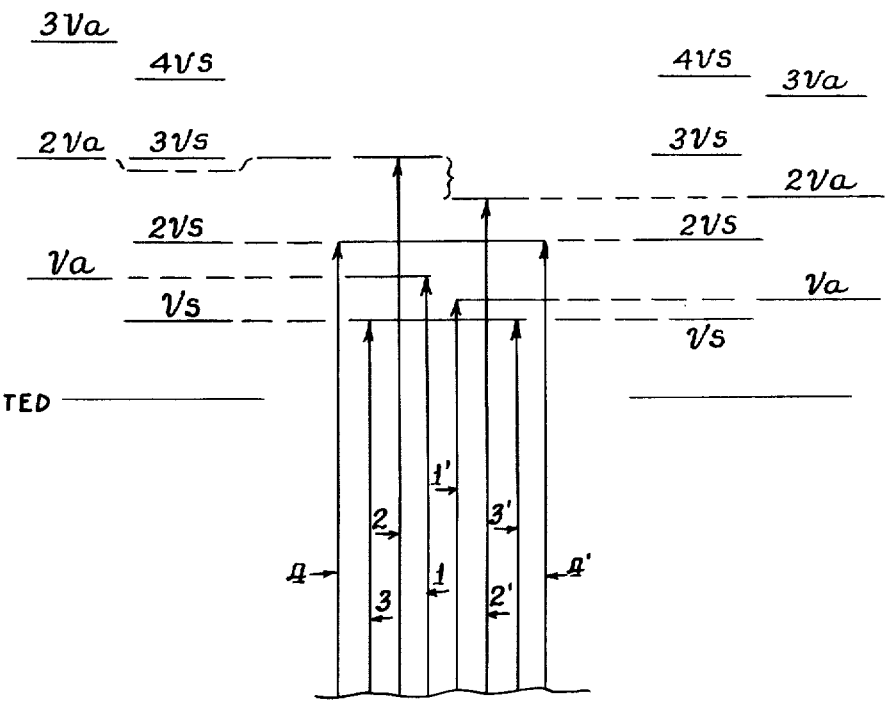
FIG. 1 is a schematic representation of the respective energy levels of the 235 and 238 isotopes of uranium in the form of uranyl salts ($UO_2^{+2}$)

Generally, the present invention is directed to methods and apparatus for separating uranium 235 from uranium 238 by selective laser excitation.

In accordance with the methods of the present invention, a photochemically reactive source material comprising a uranyl salt of an isotopic mixture of uranium 235 and 238 to be separated is selectively irradiated at an isotopically split absorption wavelength at an effective temperature for such isotopic splitting below about 77° Kelvin. Such selective excitation produces an electronically excited population which is preferred or "enriched" in respect of the isotope which preferentially absorbs the selective irradiation.

Subsequently, the source material including the isotopically selectively excited species is further irratiated at said low temperature to selectively photochemically reduce the selectively excited isotopic species and convert the species to a form chemically separable from the original uranyl salt compound. The selectively reduced isotopic compound is then chemically separated from the remaining uranyl salt compound.

As indicated, the present invention utilizes photochemically reactive uranyl salts (the uranyl cation is hereinafter sometimes referred to as $UO_2^{+2}$). In general, uranyl salts which exhibit photochemical reaction at ordinary temperatures, such as temperatures above about 273° K., to produce the characteristic green of tetravalent uranium ($U^{+4}$), may be regarded as potential starting materials, and the uranyl salts should best be compounds in which an anion is a reducing agent, or mixed crystals in which another cation is a reducing agent. Such compounds will not generally exhibit appreciable, conventional photochemical behavior at the low isotopic selective photo excitation temperature. Examples of uranyl compounds which have been investigated in respect of photochemical reactivity includes salts, mixed salts, and coordination compounds such as uranyl formate monohydrate [$UO_2$ $(HCOO)_2 \cdot H_2O$], basic uranyl formate [$UO_3 \cdot 2H_2O \cdot UO_2$ $(HCOO)_2 \cdot H_2O$)], mixed ammonium uranyl formate and the ethylene diamine tetraacetic acid precipitate of uranyl ion. Uranyl formate monohydrate is preferred because of the high concentration and close proximity of reactants.

The uranium salt source material should best be in crystalline form, and in this connection, while it may be in a microcrystalline, or comminuted form and need not be of single or large crystal form, it should not best be of an amorphous or glassy form. In a crystal the atoms (or ions) occupy positions of well defined and uniform energy and are free from collisional perturbations, conditions that are conducive to well-defined energy levels and sharp spectra. In general, however, the energy levels couple with the lattice modes of the crystal and the absorption spectra are characteristically broad. With uranyl salts, however, and particularly at low temperature, coupling with the lattice is limited or absent and sharp absorption spectra may be observed.

As indicated, in accordance with the present method, the uranyl salt source material is selectively photoexcited at low temperature. Uranyl salts are characteristically yellow and frequently fluorescent, and the general basis for the interpretation of the electronic spectra of uranyl compounds has been developed as well as a partial theoretical interpretation from a molecular orbital viewpoint [Dieke et al., and Rabinowitch et al., supra; McGlynn et al., J. Mol Spectrosc. 6, 164 (1961)]. Spectroscopic investigations, and particularly the low-temperature investigations [G. Dieke, supra] lead to an energy level system such as shown schematically in FIG. 1, for both the 235 and the 238 isotopes of uranium. Although allowed transitions to higher electronic states exist, transitions to the lower excited electronic state shown are forbidden by first-order quantum mechanical selection rules. Extinction coefficients are characteristically small and the excited states have long natural lifetimes. The uranyl ion is only weakly coupled to the lattice in many instances. When this occurs, radiationless return to the ground state is relatively slow and many uranyl salts are characterized by unusually long-lived fluorescence. The vibrational structure of the energy levels shown in FIG. 1 is central to selectivity. The normal vibrational modes of the uranyl ion include asymmetric modes that will differ in energy for the 235 and the 238 isotopes. Optical absorption involving a transition to an excited asymmetric vibrational level of the electronically excited state, for example transitions labelled 1 and 1' or 2 and 2' in FIG. 1 will show an isotopic splitting, providing the basis for selective electronic excitation of $^{235}UO_2^{+2}$, and the expected isotopic splitting has been observed at temperatures of about 20° Kelvin. However, line broadening effects which are detrimental to isotopic splitting tend to decrease the degree of splitting as a function of increasing temperature, so that isotopic splitting observable at 20° K. has not been observable at 77° K. Accordingly, selective excitation will generally be carried out at a temperature below about 77° K. at which a suitable degree of isotopic splitting may be obtained. There is generally not a physical lower limit on the temperature for selective excitation, but since the material will have to be brought to and maintained at the operating temperature, it is practically desirable that the operating temperature be as high as possible.

The selective excitation is carried out at an absorption wavelength in the range of from about 20,000 to about 27,000 cm$^{-1}$, and evaluation of appropriate photochemically reactive material, operating temperatures and isotopically selective wavelengths for selective photoexcitation of particular source materials may be carried out at a desired temperature using a spectrograph having appropriate resolution, such as a resolution capability at least sufficient to distinguish line separations of 0.2 cm$^{-1}$. This examination should best be carried out using crystals in which the ratio of the 235 isotope of uranium to the 238 isotope of uranium in the crystal is about 1:1. Observation of isotopic splitting at a given temperature for a particular photochemically reactive salt, and the degree of such splitting, may be considered in determining suitable salts and operating temperatures. In this connection, the available wavelength distribution of the particular light source to be used for selective excitation should also be considered in determining the overall efficiency and degree of preferential excitation of the desired isotopic species. The line broadening effect of higher temperature and resulting decrease in selectivity, may be balanced against the benefit of decreased cooling requirements at higher temperature in the determination of optimum operating temperatures.

The selective excitation of the desired isotope at low temperature involves both a spectral isotope effect and a sufficiently monochromatic light source such as a laser to supply light energy at an isotopically selective absorption wavelength of the source material.

Furthermore, the selectively excited species should undergo a transformation leading to chemically separable species, but nonreactive thermalization of the excited species should not proceed at a rate so much greater than the transformation that energy utilization is impractically low. In addition, processes resulting in transfer of excitation to the undesired isotope should not proceed at a rate much faster than the transformation process. Moreover, the transformed, chemically separable product should not subsequently exchange with the unreacted starting material at a rate which prevents chemical separation from being effectively carried out.

In the field of selective laser chemistry and laser isotope separation, however, it is recognized that a desired selective outcome is often precluded by the inability to attain a transformation into a separable species before scrambling processes intervene or the energy of excitation is dissipated. However, the high intensity and coherence obtainable with a laser source tends to reduce the time scale of a photo process following selective absorption so that in various circumstances a photo process leading to a desired product may compete with scrambling or dissipation. The process of the present invention may utilize such a high photon flux acceleration subsequent to selective excitation in order to achieve the desired separation.

As indicated, the desired uranium isotope is selectively excited, and for practical reasons it will be an absorption line of the 235 isotope which is normally selected for excitation because it is more efficient to selectively transform the smaller quantity of the scarcer isotope.

In connection with the method, utilization is made of the behavior that at low temperature the combination electronic and vibrational transitions of the uranyl ion may be essentially uncoupled from the lattice, consequently showing a structure primarily determined by the characteristics of the uranyl ion itself, and the upper level of the forbidden transition is relatively long-lived. Because of the uncoupling, the energy levels are sharply quantitized and unperturbed; hence, the transitions are of narrow bandwidth. Some transitions include one, or occasionally more, quanta of asymmetric vibration, producing isotopic splittings of the order of 0.7 cm$^{-1}$ or multiples thereof. (In addition to the asymmetric stretching modes, the $UO^{+2}_2$ ion has a bending vibration. This vibration also shows an isotope effect, but both the frequency of the vibration and the isotopic splitting are expected to be smaller. The shift has been estimated to be of the order of 0.2 cm$^{-1}$ but has not been experimentally unambiguously identified in either absorption or fluorescent spectra.)

Such isotopic effects permit preferential isotopic excitation of one uranyl isotope species by selective irradiation and absorption at low temperature at an isotopically split wavelength in the 20,000–27,000 cm$^{-1}$ range. However, such low temperature primary excitation does not by itself produce the permanent separative effect which is utilized herein. In this latter connection, photochemical reduction reaction of the selectively excited species is induced to provide a chemically separable species. The lowest excited electronic state of $UO^{+2}_2$ is well known to be involved in the extensive photochemistry of uranyl compounds and although most photochemical investigations have been conducted with solutions, it has long been known that some solids also have photochemical activity [Rabinowitch et al., supra; Burrows et al. Chem. Soc. Rev. 3, 139 (1974), Mueller, A., Z. Anorg. Allg. Chem., 93 267 (1915)]. The complex photochemical behavior of several solid uranyl compounds has been investigated, and from this work it may be concluded that a thermal process follows the absorption of light in the overall reaction scheme. While the heat of activation for this process is small, it is sufficient that the chemical reaction does not proceed at a rate comparable to fluorescent decay at temperatures sufficiently low for the isotopic splitting to be observed. Consequently, a simple, single photon approach to enrichment in solids at low temperature is substantially precluded.

At the light intensities available from laser sources, however, it is feasible to prepare a population of uranyl ions in the source material in a long-lived, excited state. The thermal barrier remaining is of the order of a vibrational quantum. Accordingly, by imparting an appropriate vibration to the electronically excited species via an infrared laser, the photochemical reduction reaction may proceed in the low temperature range at which the isotope splitting permits selective excitation of one isotopic uranium species. Alternatively, the initially excited level might be further excited electronically to a state from which it would react without a thermal barrier. In either event the overall reaction may proceed to $U^{+4}$, which may subsequently be separated by conventional chemical treatment.

Figure 2:
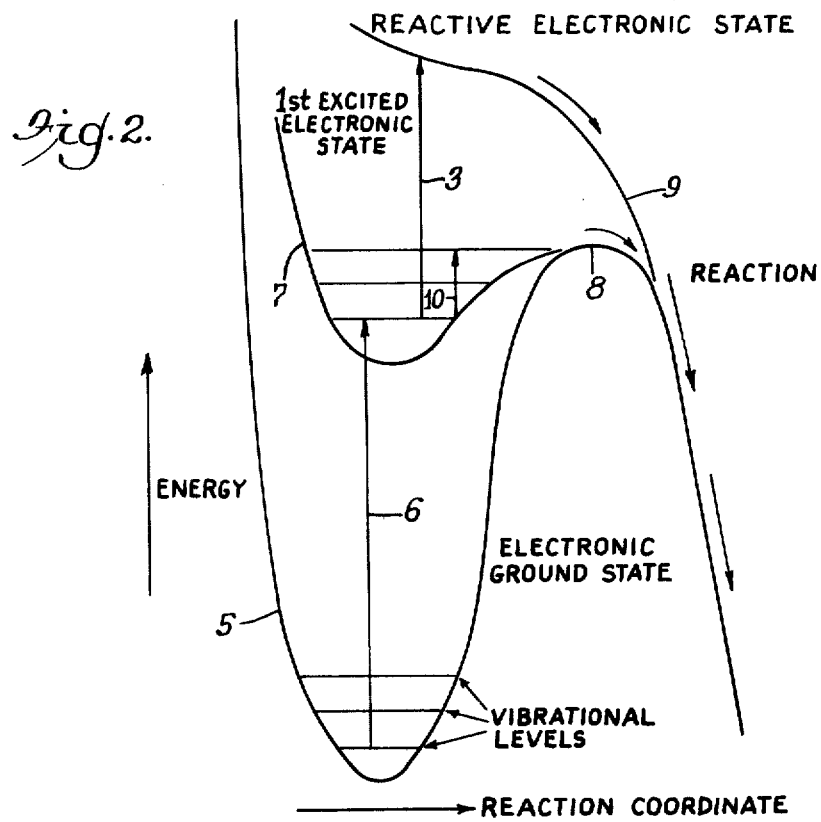
FIG. 2 is a schematic representation of reaction modes in accordance with the present invention along energy and reaction coordinates.

The infrared vibrationally induced, and electronically induced reaction modes are shown schematically in FIG. 2 along energy and reaction coordinates as shown in the drawing. In the drawing, the electronic ground state of the uranyl salt is shown by curve 5.

Initial selective excitation is indicated by reference numeral 6, and produces a population in a first excited electronic state indicated by curve 7. For the reaction mode completed by vibrational excitation the photochemical reaction route involves vibrational excitation at least sufficient to increase the energy to an amount greater than the threshold energy barrier for the photochemical reaction at point 8 on the curve 7, followed by reaction, as indicated. For the reaction mode completed by additional electronic excitation, the reaction route proceeds via electronic excitation indicated by numeral 3 to produce a reactive electronic state shown by curve 9, followed by reaction. Through these reaction routes, photochemical reduction reaction of the selectively excited uranyl isotope species is enabled to permit transformation into a chemically isolatable species through the photochemical reduction of the uranyl ion to tetravalent $U^{+4}$ with oxidation of the anion.

Uranyl photoreactivity has been investigated for uranyl formate, basic uranyl formate, mixed crystal ammonium uranyl formate, and the ethylene diamine tetracetic acid precipitate of uranyl ion. The photochemical reactivity of uranyl formate has long been known but the reaction has not been quantitatively described until recently, when investigations established that the reaction was first order in light intensity and independent of wavelength to a first approximation for wavelengths shorter than that corresponding to the energy separation of the ground state and the lowest excited electronic state. It has been determined that the extent of reaction is not, however, proportional to the light absorption but rather has a reaction curve slope which decreases with exposure without reaction saturation. Spectroscopic considerations eliminate the possibility of light filtering by the product and the failure to achieve saturation is incompatible with an explanation based on a photochemical back reaction.

A phenomenological model was developed on the basis of the following set of formal processes:

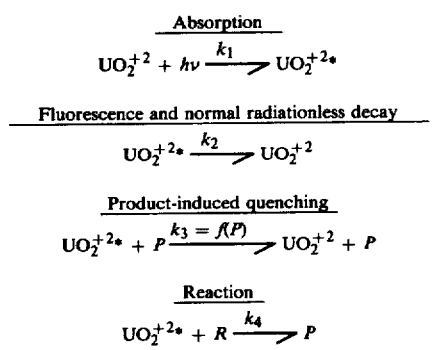

where $k_1$, $k_2$, $k_3$ and $k_4$ are the respective rates of the indicated reactions, $UO_2^{+2*}$ represents a photo excited state, P represents the photochemical reaction product, and R represents an oxidizable material such as an anion or another cation.

The experimental behavior of the system was described by this model assuming that $k_3$ is proportional to the second power of the product concentration. This assumption leads to an expectation that the amount of reaction should be proportional to the cube root of the light absorption, which is generally in agreement with the experimental data.

The second power dependence of the rate constant for the third process is in agreement with the hypothesis that this process consists of the radiationless transfer of excitation from the uranyl to the product $U^{+4}$ followed by rapid radiationless decay. Radiationless energy transfer of the sort assumed has been well characterized for other condensed phase systems [T. Forster, Discuss. Faraday Soc. 27, 7 (1959); D. Dexter, J. Chem. Phys. 21, 836 (1953)]. The slope of the line provides a measure of the chemical reaction rate constant, $k_4$.

By carrying out photochemical yield experiments over a range of temperatures, the temperature dependence of the chemical reaction rate constant can be determined. From these results the heat of activation of the chemical reaction of the excited $UO_2^{+2}$ can be evaluated. This was done for the materials studied with the following results:

| Material | Heat of Activation (kcal/mole) |
|---|---|
| Uranyl formate | 3.6 |
| Basic uranyl formate | 3.5 |
| Ammonium uranyl formate | 3.7 |
| EDTA salt of $UO_2^{+2}$ | 4.4 |

Although the heat of activation is small, the selective excitation must be carried out at very low temperatures to provide an appropriate isotopic splitting in absorption. Based on a heat of activation of 3.6 kcal, the rate at a temperature of, for example, 20 K. would be expected to be only $10^{-37}$ of the rate of 298 K. Since fluorescence is observed at temperatures not far below 0° C., it is concluded that the chemical reaction would not compete with fluorescent decay at low temperatures. Therefore, a simple single photon process does not appear possible.

Expressed in spectroscopic energy terms, the activation energy is on the order of about 1200 cm$^{-1}$. This is of the order of a single vibrational quantum, and represents an energy increment which may be supplied by an infrared laser so that selective reaction may be induced at low temperature through substantially simultaneous electronic and vibrational excitation of a reaction center.

In one embodiment of the method, an appropriately tuned laser operating in the range of about, for example, 4500 Angstroms is used to selectively pump a significant fraction of the $^{235}UO_2^{+2}$ ions into the electronically excited state at cryogenic temperature. Then in a time that is short (compared with the fluorescent decay period), an intense pulse from an infrared laser is employed to supply the vibrational activation required to complete the reaction. For this second step a pulse of high flux is indicated since the vibrational relaxation time is short compared to the fluorescent decay period. At a high flux, if a vibrational excitation of a selectively electronically excited uranyl ion relaxes, it can again be vibrationally excited within the fluorescent decay period. The underlying observation is that the heat of activation is about 3.5 kcal/mole, a value which is comparable to a bond stretching vibration. The second photon excitation will involve an empirically determined wavelength at sufficient power in timed relation with the primary excitation that the stimulation of the reaction of the initially excited state will occur in a time of the order of fluorescent lifetime, which is the order of about a millisecond.

In understanding the empirical determination of appropriate infrared wavelength, it will be recognized that those stretching modes involving the uranium oxygen bond, or bonds of the atoms adjacent to the $UO_2^{+2}$ ion of the selectively irradiated source material are most likely to be efficacious in inducing photochemical oxidation-reduction reaction in respect of the selectively irradiated or activated component of the source material. Accordingly, the empirical determination of suitable infrared frequencies may be concentrated at the frequencies of such modes, which are known or may be estimated by standard infrared and Raman spectral measurements. For example, in uranyl formate salts, the infrared photochemical reaction inducing radiation may not only utilize uranium-oxygen bond frequencies, but may utilize absorption frequencies of the salt anion component, in this case, the formate anion absorption frequencies such as those associated with the carbonyl bond of the formate anion. Similarly, other appropriate infrared absorption frequencies of other photochemically oxidizable (with concomitant reduction of $UO_2^{+2}$) anion components of the photochemically reducible uranyl salt source material may be selected. Similarly, the uranyl salt source material may be a mixed salt with another organic or inorganic cation component, which may provide a photochemically oxidizable moiety, and/or which may provide an infrared absorption frequency to be utilized in the photochemical reaction of the selectively excited species.

As indicated, the secondary stimulation for photoreaction transformation may be electronic rather than vibrational. In this latter connection, it is known that uranyl ions exhibit induced absorption, that is, absorption from the lower excited electronic state into still higher electronic states [Robinson, C. C., J. Opt. Soc. Amer. 57, 4 (1967)]. The stability of the $UO_2^{+2}$ ion will be less in higher excited states and reaction may occur from an appropriate state without thermal activation. In utilizing multiple electronic excitation at low temperature, the initially cryogenic-temperature excited $UO_2^{+2}$ (generally the 235 isotope) which has been selectively pumped into the first excited electronic state, will then be further excited utilizing either a second quantum of the same frequency or an appropriate pulse of another frequency within the fluorescent lifetime of the excited species.

As a low-temperature, solid-state process, the method of the present invention is not subject to collisional excitation transfer as in a gas-phase process. However, often recognized phenomena that might lead to either excitation transfer or product scrambling are radiationless transfer of the initial excitation or chemical exchange between uranyl ions and $U^{+4}$ during separation. Quantum mechanical excitation transfer in condensed media has been recognized and theoretically described [T. Forster, supra (1959); D. Dexter, supra]. From the published results for dye solutions and certain classes of solid-state fluorescence, it might initially appear that uranyl compounds should be subject to rapid transfer. But it must be recognized that the usual calculations are based on normal transition moments and line breadths. For uranyl salts the transitions are forbidden and have, as a consequence, very low transition moments. Further, at low temperatures, the observed line spectra will have small overlap integrals. Considerations of this kind are implicit in the interpretation of impurity line widths and temperature broadening given by Dieke et al., supra. Of the spectral data, the most direct evidence is the observation of isotopic splitting. Such resolution should not be observable if resonant transfer were extremely fast.

The second recognized source of selectivity loss is exchange between source material uranyl ion and photochemically produced $U^{+4}$. Appropriate consideration of results for uranium exchange in aqueous $UO_2^{+2}$ and $U^{+4}$ solutions and direct exchange measurements [D. Lipkin et al., supra; R. Betts et al. Can. J. Res. 26B, 702 (1948); E. Rona, Amer. Chem. Soc. 72, 4339 (1950)] in the context of the present method indicates that chemical separation of the $U^{+4}$ produced may be carried out under conditions in which such exchange is not materially detrimental to the isotopic separation. For selectivity it is sufficient that the rate of processes leading to selectability be comparable to and preferably greater than processes leading to unselective production of the same chemical or physical state.

While, in general, the transformation excitation need not be isotopically selective, vibrational distortion along the reaction coordinate may provide for selective infrared vibrational excitation of the preferentially excited species, thereby reducing or eliminating the energy losses via excitation of the ground-state $238_U$ species. If selective infrared vibrational excitation is employed using selective infrared radiation at a vibrational absorption wavelength which is selective to the electronically excited species, higher overall energy utilization may be provided.

Figure 3:
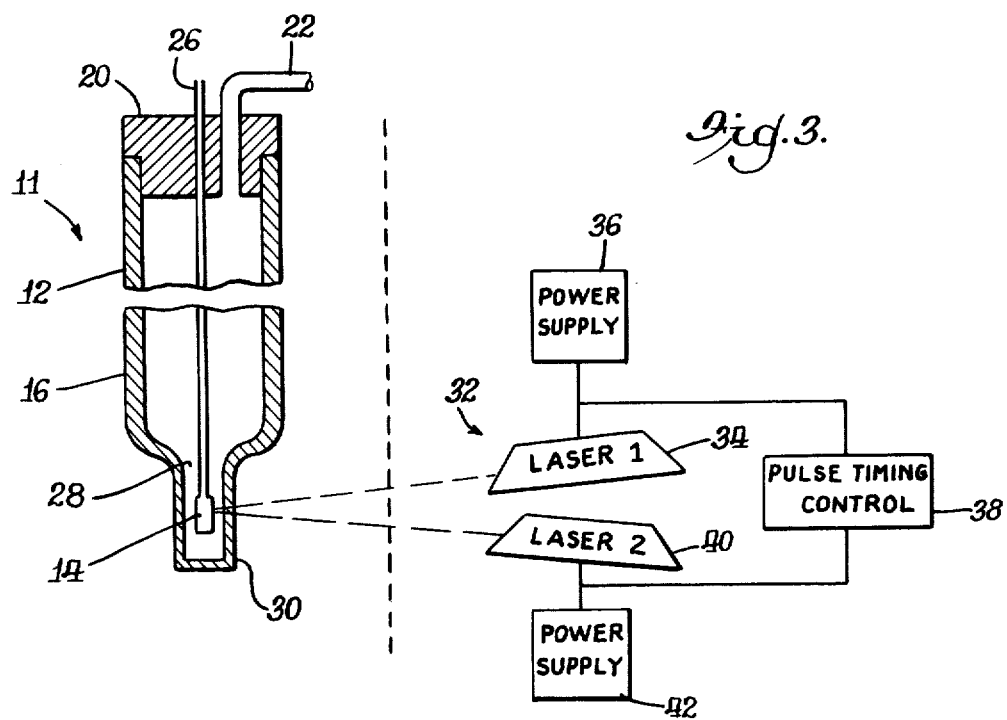
FIG. 3 is a schematic illustration of an embodiment of apparatus for carrying out selective excitation and photoreactive transformation in uranium isotope separation.

The present invention also contemplates apparatus for carrying out the cryogenic selective photoreactive transformation process. Illustrated in FIG. 3 is apparatus 11, which is particularly adapted to carry out selective excitation and photoreactive transformation steps contemplated by the present invention. In the illustrated embodiment, there is provided means 12 for maintaining source material 14 at a low temperature such as the temperatures of liquid hydrogen, at which suitable isotopic absorption line separation is provided in the range of from about 20,000 to about 27,000 cm$^{-1}$. In the illustrated embodiment, the low temperature means comprises a Dewar flask 16 having internal vacuum wall zone with reflective surfaces such as silvered surfaces, and the interior of which contains liquid hydrogen. The Dewar flask 16 has an appropriate cap 20 having a hydrogen gas vent 22 and a passageway 24 for a source material positioning rod 26. A source material, which will be a suitably photoreactive uranyl salt, is positioned in a bottom zone 28 of the Dewar flask which is provided with optical windows 30 transparent to laser radiation from a laser irradiation means 32.

The laser irradiation means 32 comprises a first laser 34, such as an etalon tuned dye laser having an emission line tuned to an isotopically distinguishable absorption line of the 235 isotope of the source material 14 in the range of from about 20,000 to about 27,000 cm$^{-1}$. The laser 34 is provided with an appropriate power supply 36 and the firing of the laser 34 and power supply 36 is governed by pulse timing control means 38. The coherent isotopically selective radiation from laser 34 is directed upon the source material 14 through the optical window 30 of the low temperature treatment zone means 12.

A second laser 40 is also provided which is tuned to an infrared wavelength corresponding to the absorption wavelength of the uranium-oxygen bond stretching vibration mode of the electronically excited source material 14. The laser 40 is similarly provided with a suitable power supply 42 which is also under the control of pulse timing control means 38. The coherent infrared radiation beam from laser 40 is similarly directed toward the source material 14 through the optical window 30 of the low temperature means 12. Both the initial selective excitation, and the transformation excitation will preferably be pulsed for energy (photon) utilization considerations, as well as to provide for keeping the source material cold, which may be more difficult under continuous wave illumination. In operation, the pulse timing control 38 initiates a pulsed discharge of the laser 34 to provide a population of preferentially electronically excited uranyl ions of the 235 isotope. The pulse timing control 38 also causes the pulsed firing of laser 40 to direct the infrared beam from laser 40 upon the source material 14 in suitably timed relationship to discharge of the laser 34 and within the fluorescent lifetime of the excited species induced by the laser 34. Through the initial selective excitation provided by laser 34, and the vibrational excitation provided to the uranyl uranium-oxygen bond, the 235 isotopic salt of the source material is selectively reduced to the tetravalent oxidation state $U^{+4}$, with concomitant oxidation of the anion of the source material 14. The source material 14 may be removed from low temperature means 12 and the selectively photoreduced isotope of the source material may subsequently be separated from uranyl salt of the source material by conventional chemical techniques under conditions which do not unduly promote isotopic exchange. In this connection, the irradiated source material may be subjected to separation processing in aqueous media such as by extraction of uranyl $UO_2^{+2}$ from acid, nitrate-containing solution through the use of tributyl phosphate, leaving an enriched tetravalent uranium $U^{+4}$ in the aqueous phase. Similarly, solution of the selectively irradiated source material in dilute mineral acid containing a relatively small amount of fluoride ion may be employed, resulting in the precipitation of enriched tetravalent uranium $U^{+4}$ as uranium fluoride $UF_4$, and permitting removal of unreached uranyl ion as an aqueous solution. Suitable means (not shown) may be provided for carrying out such chemical separation steps.

As indicated previously, the infrared vibrational excitation may also be provided to an atom or bond adjacent the uranyl ion. For example, a salt such as uranyl formate monohydrate may be ground to a particle size of about 50 microns and distributed in a uniform layer 0.5 mm in depth on a support of high thermal conductivity such as cooper. The copper support and sample, maintained in vacuum for thermal insulation, may be cooled to a temperature of about 10 K. by conduction to a supply of liquid helium.

The primary or electronic excitation may be provided by a nitrogen laser pumped dye laser tuned to a wavelength of 4695.6 A and delivering 5 nanosecond pulses of 100 $\mu j$ at 10 pulses per second.

The further irradiation to induce the photochemical reaction may be provided by an appropriate infrared laser tuned to the carbonyl stretching frequency of the formate ion and pulsed synchronously with the dye laser. The appropriate wave length, which lies in the vicinity of 12.5 microns, is appropriately estimated from infrared spectra and refined by adjustments to optimize the isotope separation. The pulse energy of the infrared laser is appropriately 100 $\mu j$.

The combined beams from the dye laser and infrared laser are focused to a spot 1 mm in diameter at the surface of the uranyl formate with an appropriate lens system.

To provide uniform excitation, the target is moved by appropriate translation devices to provide an apparent motion of about 1 mm per 5 seconds.

Irradiation is continued for about 150 minutes per square centimeter of target area.

Following irradiation, the target material may be warmed to normal ambient temperature, dissolved in 0.1 ml of 4 molar hydrochloric acid per mg. of uranyl formate monohydrate and the $U^{+4}$ product separated from the unreacted $UO_2^{+2}$ using an anion exchange resin column according to the methods described by Kraus, et al., [Jour. Amer. Chem. Soc., 77, 3792 (1955); 78, 2692 (1956)].

It will be appreciated that in accordance with its present invention, improved methods and apparatus for uranium enrichment have been provided. While the present invention has been described with respect to certain embodiments, it will also be appreciated that various modifications of the present disclosure will be apparent to those skilled in the art and are intended to be included in the spirit and scope of the appended claims.

Various of the features of the present invention are set forth in the following claims.

What is claimed is:

1. A method for separating uranium isotopes comprising the steps of providing a solid, crystalline, uranyl salt source material which is photochemically reactive to reduce uranyl cations of said uranyl salt source material to tetravalent uranium ions, selectively irradiating said photochemically reactive uranyl source material at an electronic absorption wavelength in the range of from about 20,000 to about 27,000 $cm^{-1}$ which is selective to a desired isotope of said uranyl source material at an effective cryogenic temperature for isotope spectral line splitting below about 77° K. without substantial photochemical reduction of the source material, further irradiating said source material within the fluorescent lifetime of the selectively irradiated source material at a vibrational absorption wavelength of a bond of atoms or an ionic group respectively adjacent the uranyl cations of the electronically excited source material to selectively photochemically reduce the selectively excited isotopic species, and chemically separating the reduced isotope species from the remaining uranyl salt compound.

2. A method in accordance with claim 1 wherein said vibrational excitation wavelength is an infrared absorption wavelength of an anionic moiety of said uranyl source material.

3. A method in accordance with claim 1 wherein said uranyl source material is a mixed salt including at least one cationic moiety in addition to a uranyl cationic moiety and wherein said vibrational absorption wavelength is an infrared absorption wavelength of said cationic moiety.

4. A method in accordance with claim 1 wherein said crystalline source material contains a formate anion species.

* * * * *